(12) United States Patent
Engelbart et al.

(10) Patent No.: US 11,703,324 B2
(45) Date of Patent: Jul. 18, 2023

(54) APPARATUS, SYSTEMS, AND METHODS FOR THE LASER INSPECTION OF HOLES IN TRANSPARENT MATERIALS

(71) Applicant: The Boeing Company, Chicago, IL (US)

(72) Inventors: Roger W. Engelbart, St. Louis, MO (US); Elizabeth Ann Paton, St. Louis, MO (US); Christopher M. Vaccaro, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 52 days.

(21) Appl. No.: 17/522,846

(22) Filed: Nov. 9, 2021

(65) Prior Publication Data

US 2022/0146256 A1 May 12, 2022

Related U.S. Application Data

(60) Provisional application No. 63/112,099, filed on Nov. 10, 2020.

(51) Int. Cl.
| | | |
|---|---|---|
| *G01B 11/30* | (2006.01) | |
| *G01N 21/954* | (2006.01) | |
| *G01N 21/958* | (2006.01) | |

(52) U.S. Cl.
CPC ......... *G01B 11/303* (2013.01); *G01N 21/954* (2013.01); *G01N 21/958* (2013.01); *G01N 2201/06113* (2013.01)

(58) Field of Classification Search
CPC ............ A01K 13/00; A61N 2005/0633; A61N 2005/0636; A61N 2005/0654;
(Continued)

(56) References Cited

U.S. PATENT DOCUMENTS

| | | | |
|---|---|---|---|
| 6,944,377 B2 * | 9/2005 | Umebayshi | G02B 6/124 385/49 |
| 7,843,641 B2 | 11/2010 | Miener et al. | |

(Continued)

FOREIGN PATENT DOCUMENTS

WO     2011017772 A1     2/2011

OTHER PUBLICATIONS

ASTM International, F2108-17, Standard Practice for Inspection of Transparent Parts by Prism, Jun. 1, 2017, 7 pages.

*Primary Examiner* — Tri T Ton
(74) *Attorney, Agent, or Firm* — Kolisch Hartwell, P.C.

(57) ABSTRACT

Apparatus, systems, and methods for the inspection of holes in transparent materials, the apparatus including a processor, an illumination probe, and a detection probe. The illumination probe includes a laser light source and a reflective surface and is configured to be inserted into a first hole in the transparent material. The detection probe includes a second reflective surface and a photodetector and is configured to be inserted in a second hole in the transparent material. Laser light is directed onto the first reflective surface within the first hole and is reflected through a wall of the first hole, into the transparent material, and reflected by the second reflective surface to the photodetector. The photodetector transmits a measured light intensity value to the processor, which compares the light intensity value to a standard intensity value to determine whether or not a crazing condition exists in the second hole.

20 Claims, 9 Drawing Sheets

(58) Field of Classification Search
CPC .... A61N 2005/0659; A61N 2005/0667; A61N 5/0616; A61N 5/0624; A61N 5/0625; G01B 11/303; G01N 21/954; G01N 21/958; G01N 2201/06113
USPC .................................. 356/600–640, 388–398
See application file for complete search history.

(56) References Cited

U.S. PATENT DOCUMENTS

| | | |
|---|---|---|
| 9,157,869 B2 | 10/2015 | Ortner et al. |
| 9,506,879 B2 | 11/2016 | Engelbart et al. |
| 10,654,170 B2 * | 5/2020 | Hara ..................... B25J 19/025 |
| 10,768,121 B2 | 9/2020 | Paton et al. |
| 2007/0165213 A1 | 7/2007 | Fang et al. |
| 2010/0271811 A1 | 10/2010 | Miener et al. |
| 2015/0055757 A1 | 2/2015 | Engelbart et al. |
| 2019/0360945 A1 | 11/2019 | Paton et al. |

* cited by examiner

APPARATUS, SYSTEMS, AND METHODS FOR THE LASER INSPECTION OF HOLES IN TRANSPARENT MATERIALS

CROSS-REFERENCES

This application claims the benefit under 35 U.S.C. § 119(e) of the priority of U.S. Provisional Patent Application Ser. No. 63/112,099, filed Nov. 10, 2020, the entirety of which is hereby incorporated by reference for all purposes.

FIELD

This disclosure relates to methods, apparatus, and systems for inspecting holes machined in transparent materials. More specifically, the disclosed embodiments relate to methods, apparatus, and systems for the laser-based detection of crazing in the wall surfaces of holes machined in transparent materials.

INTRODUCTION

Many polymeric materials, and in particular glassy polymers, may be susceptible to a phenomenon known as "crazing." Sometimes created intentionally in ceramic glazes, crazing is the formation of a network of fine cracks on the surface of the material, typically invisible to the naked eye. Crazing is typically the result of high hydrostatic tension or very localized yielding. Although the resulting defects in the material are shallow and microscopic, when a crazed material is placed under stress the microvoids might elongate and coalesce, resulting in the formation of macroscopic cracks.

Transparent materials used in the aerospace industry, such as those utilized in aircraft canopies, may be subject to crazing when exposed to mechanical stresses, such as when holes are drilled in the material for the insertion of a fastener. The detection of crazing in fastener holes is important because it may be an indicator of an issue in the manufacturing process used. For example, the formation of crazing may indicate the use of improper drilling techniques, such as using an inappropriate drill speed, pressure, or feed rate. It can therefore be important to detect the presence of crazing promptly so that the manufacturing process may be adjusted as soon as possible.

The use of visual inspection of fastener holes may be problematic, as the naked eye is typically unable to differentiate the presence of crazing from the scratches and abrasion due to normal machining processes. Additionally, many transparent materials used in aerospace construction may be enclosed by additional and typically opaque materials, such as for example where a transparent panel is sandwiched at its edges by an aluminum frame. Such junctions may also routinely be covered by one or more sealant compositions.

Inspection of such holes is typically performed using a borescope, which includes a rigid metallic sleeve containing an optical fiber for illumination and terminating in a small lens for imaging the area of interest. The inspection is performed by inserting the lens of the borescope into a hole, and adjusting focus until the area of interest is in sharp focus. Unfortunately, such borescope may provide a view of a very small area of interest, and feature a very shallow depth of field, both of which prove disadvantageous when attempting to detect and/or identify crazing condition. At very close proximities, it becomes difficult and/or impossible to differentiate crazing from the normal surface abrasions caused by the machining process.

What is needed is a method and apparatus for detecting crazing of fastener holes that eliminates subjective human analyses and replaces them with objective evaluations. This objective evaluation should be employed to rapidly, accurately, and inexpensively detect crazing of fastener holes in transparent materials, thereby speeding production, reducing manufacturing inconsistencies, and ultimately reducing labor costs. Further, what is needed is such an apparatus that can lend itself to automated processes so that component assembly and inspection can be accomplished in an uninterrupted one-up assembly process.

SUMMARY

The present disclosure provides apparatus, systems and methods for inspecting holes in transparent materials, and in particular for detecting crazing within holes formed in transparent materials.

In an example, the disclosed inspection apparatus includes a processor, an illumination probe, and a detection probe. The illumination probe includes a first reflective surface configured to be inserted into a first fastener hole formed in a transparent material, and a laser light source configured to direct laser light into the first fastener hole so that the laser light is incident upon the first reflective surface within the first fastener hole, such that at least a portion of the incident laser light is reflected by the first reflective surface through a wall of the first fastener hole and into the transparent material. The detection probe includes a photodetector positioned to detect laser light directed from a second fastener hole formed in the transparent material adjacent to the first fastener hole and transmit a corresponding light intensity value to the processor, and a second reflective surface configured to be inserted into the second fastener hole and oriented such that laser light reflected from the first reflective surface that passes through the wall of the first fastener hole and through a wall of the second fastener hole to strike the second reflective surface is reflected toward the photodetector. The processor is configured to receive the corresponding light intensity value and compare the corresponding light intensity value to a standard intensity value.

In an example, the disclosed system for inspecting holes machined in a transparent material includes an inspection apparatus having an illumination probe and a detection probe, where the illumination and detection probes are sized and spaced to be simultaneously inserted into a first and a second of two adjacent holes machined in the transparent material. The illumination probe includes a laser light source and a first reflective surface at a distal portion of the illumination probe, and the illumination probe is configured so that when the illumination probe is inserted into the first hole the laser light source directs laser light along the first hole to the first reflective surface at the distal portion of the illumination probe, where the first reflective surface is oriented so that the laser light is reflected by the first reflective surface into the transparent material and towards the second hole. The detection probe includes a photodetector and a second reflective surface at a distal portion of the detection probe, where the detection probe is configured so that when the detection probe is inserted into the second hole the second reflective surface at the distal portion of the detection probe is oriented so that the laser light reflected by the first reflective surface into the transparent material and towards the second hole is incident upon and reflected by the second reflective surface outwardly along the second hole to the photodetector, where the photodetector measures the light intensity of the reflected laser light. The system further includes a processor that is configured to receive a measured light intensity value from the photodetector and compare the measured light intensity value with a standard value and to correlate the measured light intensity value with a presence or absence of a threshold amount of crazing at a wall surface of the second hole.

In an example, the disclosed method of inspecting holes machined in a transparent material using an inspection apparatus having an illumination probe and a detection probe includes positioning the inspection apparatus so that the illumination probe is inserted into a first hole in the transparent material and the detection probe is inserted into a second hole in the transparent material; where the illumination probe includes a first reflective surface at a distal portion of the illumination probe that is configured to be inserted into the first hole, and a laser light source configured to direct laser light along the first hole to strike the first reflective surface, so that at least a portion of the incident laser light is reflected by the first reflective surface through a first wall of the first fastener hole and into the transparent material; and the detection probe includes a second reflective surface at a distal portion of the detection probe that is configured to be inserted into the second hole, and a photodetector configured to measure an incident light intensity, so that at least a portion of the laser light passing through the first wall of the first hole and a second wall of the second hole is reflected by the second reflective surface to the photodetector; activating the laser light source; measuring by the photodetector an intensity value of the laser light transmitted through the second wall of the second hole; and communicating the measured transmitted laser light intensity value to a processor.

The disclosed features, functions, and advantages of the disclosed inspection apparatus, systems, and methods may be achieved independently in various embodiments of the present disclosure, or may be combined in yet other embodiments, further details of which can be seen with reference to the following description and drawings.

DESCRIPTION

The following definitions apply herein, unless otherwise indicated.

"Crazing" refers to both the phenomenon that produces a network of fine cracks on the surface of a material, such as the glaze layer of a ceramic, or surface of a glassy polymer, and the resulting network of cracks itself.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Crazing is perhaps best known as the network of fine cracks that may form in the glaze layer of a ceramic, either intentionally or accidentally. However, crazing can also occur at the surface of a glassy material such as a glassy thermoplastic, particularly when it is being machined.

Although described herein in the context of aerospace manufacture, it should be appreciated that the disclosed apparatus, systems, and methods may be applicable to any industry in which detection of crazing may be advantageous, and should not be limited to aircraft or aircraft construction.

Figure 1:
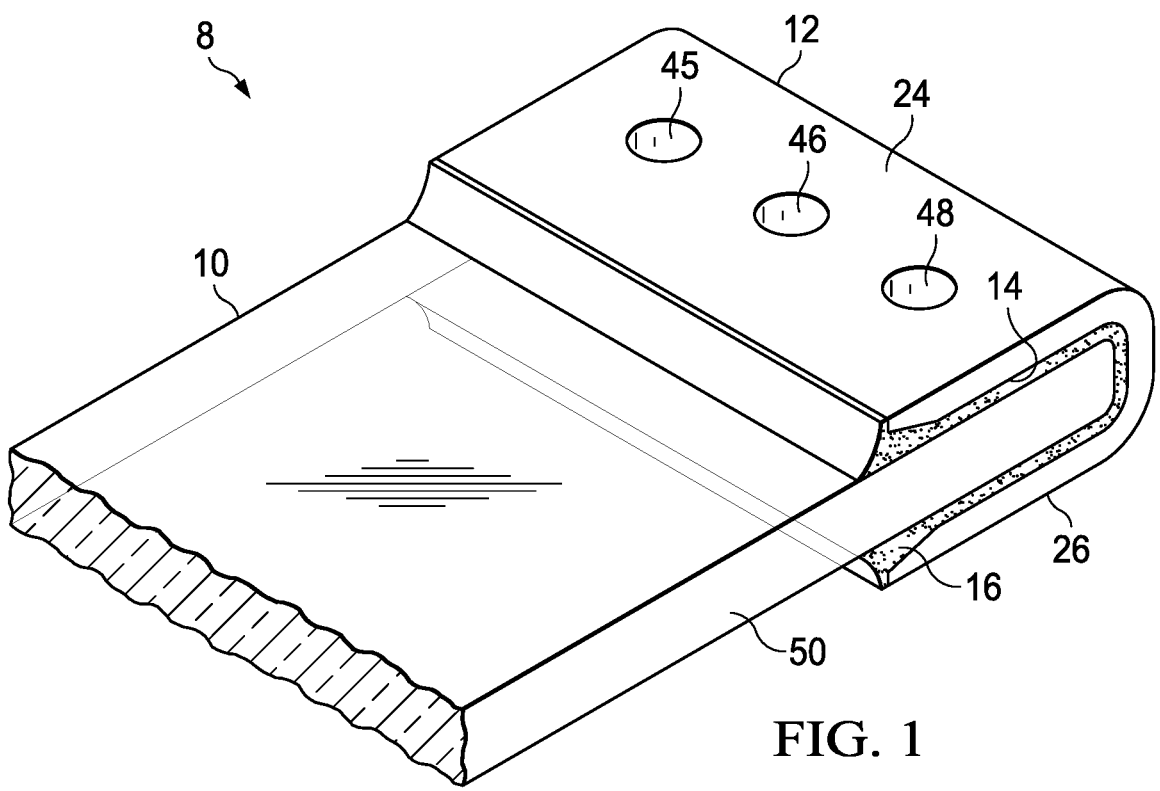
FIG. 1 depicts a portion of an object of manufacture including a transparent material partially enclosed by an opaque material, including three machined holes.

FIG. 1 depicts a portion of a panel 8, that includes a pane 10 of at least substantially transparent material mounted in a frame or rail 12. As shown by the cross-section, pane 10 is disposed within a complementary recess 14 formed in rail 12. Pane 10 may then be secured within rail 12 by application of an appropriate sealant 16. Rail 12 may enclose one or more sides of pane 10, or may extend around the periphery of pane 10.

Pane 10 may include any at least substantially transparent material, and in particular may include various thermoplastic polymer resins and thermoset polymer resins. Where pane 10 includes a thermoplastic resin, the thermoplastic resin may include high-density polyethylene (HDPE) resin, or polycarbonate resin, among others. Where pane 10 includes a thermoset resin, the thermoset resin may include a polyester resin, an epoxy resin, a phenolic resin, or a urethane resin, among others.

Rail 12 may include a metal, particularly a lightweight metal such as aluminum. Alternatively, rail 12 may be a composite structure, such as a carbon fiber composite structure.

Sealant 16 may be any sealing composition having the appropriate physical properties to provide effective sealing of the pane 10 to the rail 12. The sealant composition may be selected to undergo curing, either via the addition of an activating compound or catalyst, by the passage of time, or other mechanism. A variety of suitable sealant compositions are commercially available, including plastic sealants, rubber sealants, and varnishes, among many others. In one aspect of the present disclosure, the sealant composition may be a polysulfide-based synthetic rubber sealant, such as for example fast-curing BMS 5-45 polysulfide sealant.

As shown in FIG. 1, a pane 10 of transparent material 50 is enclosed along one edge by rail 12, and a representative trio of holes 45, 46, and 48 are depicted. Holes 45, 46, and 48 may be machined in the sandwich edge structure after it is formed, and therefore extend through a first side 24 of rail 12, through the width of pane 10, and through a second side 26 of rail 12. Although the present disclosure employs an exemplary panel 8 that includes holes that extend throughout the panel, it should be appreciated that the present apparatus, systems, and methods may be used to inspect holes machined in panels that do not extend completely through the entirety of the panel of FIG. 1, including pane 10 and rail 12. The holes 45, 46, and 48 may be machined in panel 8 for any appropriate reason. In one aspect of the disclosure, holes 45, 46, and 48 are machined in panel 8 in preparation for receiving a fastener to secure panel 8 to another component.

Where a hole to be inspected is a hole for receiving a fastener, the intended fastener may be for example a nail, a bolt, a pin, or a screw, among other conventional fasteners. Alternatively or in addition, the fastener may include a hardware assembly having multiple individual pieces of hardware, such as for example an anchor used to retain a bolt in place, a nut, a collar, or a spacer to occupy a defined space for the fastener installation.

Although the naked eye is not typically capable of discerning the presence of crazing, the fine microstructure of cracks that is created by crazing has a distinctive scattering effect on incident light. However, by illuminating a fastener hole from the side and inspecting it visually, the presence of crazing in a machined hole in pane 10 may be detected.

Figure 2:
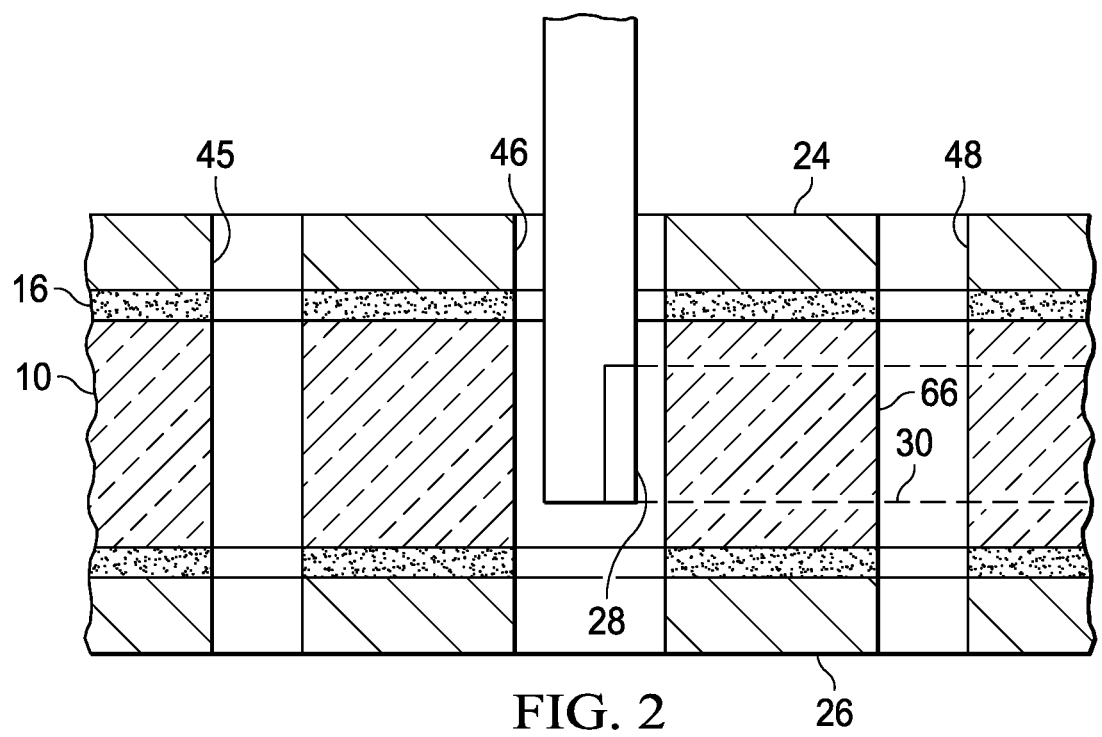
FIG. 2 is a partial cross-section view of the object of manufacture of FIG. 1 that includes the three machined holes, showing a light source inserted into the central machined hole.

For example, as shown in FIG. 2, the walls of fastener hole 48 can be illuminated by inserting a light source 28 into adjacent fastener hole 13, and directing light along a light path 30 that is at approximate right angles to the axis of fastener hole 46 in the direction of fastener hole 48 so as to illuminate an inner surface 66 of a wall 64 of hole 48. In the absence of crazing, the illumination passes through inner surface 66 with perhaps a slight decrease in light intensity. However, where the inner surface 66 of fastener hole 48 is crazed, the incident light from adjacent hole 46 may be substantially scattered by diffraction and/or refraction caused by the finely spaced cracks present in inner surface 66 due to such crazing. As a result of the diffusion of the illumination, the intensity of the light detected within hole 48 along light path 30 is significantly decreased.

The bright and sharp illumination of hole 48 in the absence of crazing can be distinguished from the diffuse illumination caused by light scattering due to crazing, even by visual observation, but the presence or absence of crazing in a hole under observation may alternatively be determined with instrumental assistance. For example, crazing may be detected by measuring a percentage of the light transmitted from light source 28 through surface 66 as measured by a photodetector. The measured amount of light transmitted to the photodetector may then be compared to a precalculated acceptable range of percentage of light transmission. A light intensity measured by the photodetector that falls outside the predetermined acceptable range is correlated with the presence of a crazing condition in and on surface 66.

An observed decreased light intensity measured in hole 48 when illuminated from hole 46 may be indicative of crazing in the wall surface of either hole. In order to correlate a decrease in light intensity with crazing in surface 66 of hole 48, the possibility of crazing in the surface of hole 46 should first be eliminated, either by visual or instrumental inspection. Where a series of fastener holes is spaced an equal distance apart from one another, such as holes 45, 46 and 48, an absence of crazing can be verified for hole 45. Hole 46 can then be examined with illumination from hole 45 to detect crazing in hole 46. If hole 46 is deemed to have no crazing, then hole 48 can be illuminated from hole 46, and so on.

The precalculated acceptable range of percentage light transmission may be determined, for example, by measuring percentage light transmission for correctly drilled holes (e.g., light source inserted in a correctly drilled hole and directed toward a correctly drilled adjacent hole). The transmission through the correctly drilled hole could be standardized at 50% and an exemplary precalculated acceptable range of percentage transmission could be 50%+/−10% to allow for normal variation among various correctly drilled holes. Any hole that transmits more than 60% light or less than 40% light would then be considered outside the predetermined acceptable range and would be subject to further review. It should be understood that the transmission value through correctly drilled holes, as well as the acceptable variance in the percentage of light transmission, will vary with workpiece configuration, material, geometry, and the like.

Unfortunately, direct observation of inner surface 66 of hole 48 is difficult, as sides 24 and 26 of rail 12 extend along the surface of pane 10 sufficiently far that a direct visual or instrumental examination of the illuminated hole 48 is made difficult.

EXAMPLES, COMPONENTS, AND ALTERNATIVES

Various aspects and examples of a hole inspection apparatus, hole inspection system, and hole inspection methods are described below and illustrated in the associated drawings. Unless otherwise specified, a hole inspection apparatus and/or its various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

Example 1

Figure 3:
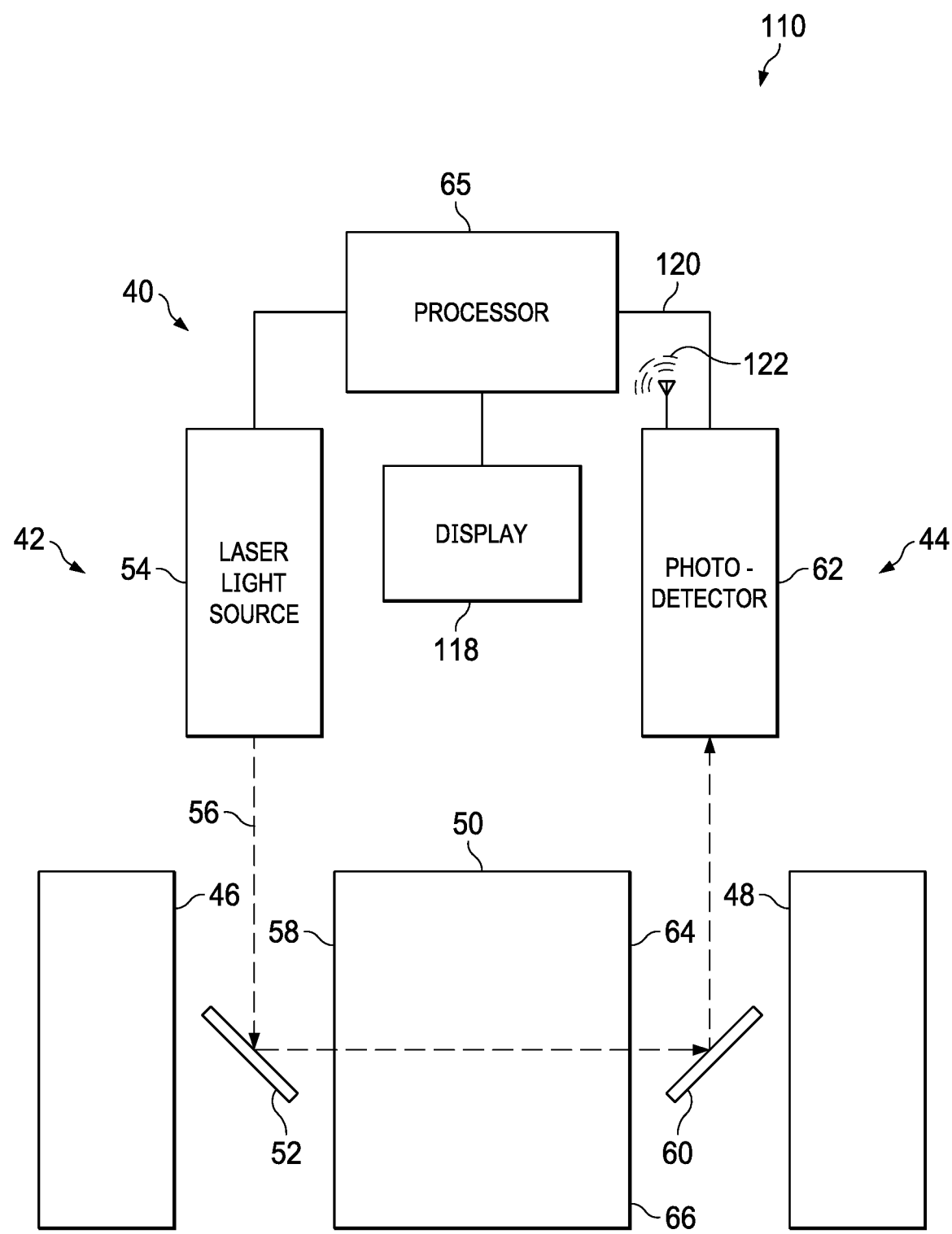
FIG. 3 schematically depicts an example system and apparatus for inspecting holes machined in a transparent material, according to the present disclosure.
Figure 4:
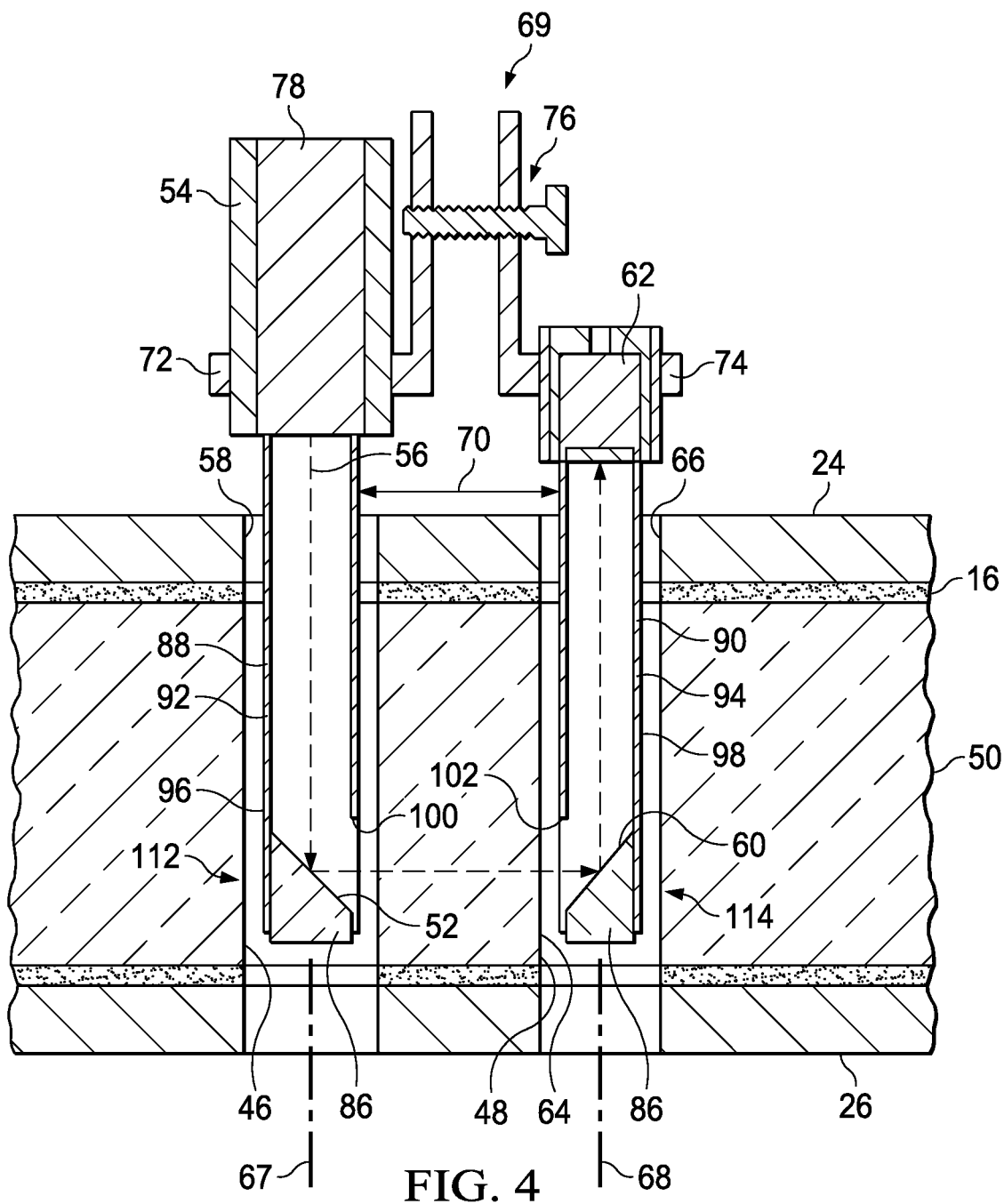
FIG. 4 is a cross-section of an example inspection apparatus according to the present disclosure inserted into adjacent holes in a transparent material.

An exemplary inspection apparatus 40 for the inspection of holes in transparent materials is shown schematically in FIG. 3 and semi-schematically in FIG. 4. Apparatus 40 includes an illumination probe 42 and a detection probe 44, where both illumination probe 42 and detection probe 44 are sized and shaped to be insertable into a pair of holes 46, 48 in a transparent material 50. Holes 46 and 48 are typically fastener holes, and can be, but are not required to be, immediately adjacent to one another.

Illumination probe 42 includes a first reflective surface 52 that can be inserted into first fastener hole 46 formed in transparent material 50. Illumination probe 42 additionally includes a laser light source 54 that is configured to direct laser light 56 into and along first fastener hole 46 so that laser light 56 is incident upon first reflective surface 52 within first fastener hole 46. Illumination probe 42 is constructed and aligned so that at least a portion of the laser light 56 that is incident upon first reflective surface 52 is reflected by first reflective surface 52 through a wall 58 of first fastener hole 46 and into transparent material 50.

Detection probe 44 includes a second reflective surface 60 and a photodetector 62 and is configured so that detection probe 44 can be inserted into second fastener hole 48 and second reflective surface 60 is positioned so that laser light 56 that was reflected from first reflective surface 52, passed through inner wall 58, through intermediate transparent material 50, and through an inner wall 64 of second fastener hole 48 is incident upon second reflective surface 60. Second reflective surface 60 is additionally oriented so that the incident laser light 56 received through transparent material 50 is reflected along second fastener hole 48 to be incident upon photodetector 62, which is typically positioned outside second fastener hole 48. In some examples, photodetector 62 is positioned inside second fastener hole 48.

Photodetector 62 detects laser light 56 that falls upon it, and measures a corresponding light intensity value for that light. The corresponding light intensity value is then be transmitted to a processor 65 (depicted schematically in FIG. 3) that receives the corresponding light intensity value and compares it to a standard intensity value. A received light intensity value that is compared to the standard intensity value and found to be less than the standard intensity value can be considered indicative of the presence of crazing in wall 64 of second fastener hole 48.

Processor 65 can be physically coupled with the other elements of apparatus 40, for example contained with an apparatus casing and wired directly to one or more additional components the apparatus 40. Alternatively, processor 65 can be physically unconnected to the other components of apparatus 40, and receive light intensity values from photodetector 62 wirelessly. Apparatus 40 can include more than one processor, where one or more can function as a controller for laser light source 54 and photodetector 62, and optionally for a power supply (not shown) to power those components.

Processor 65 can optionally be further configured to calculate a percentage of the light transmitted from laser light source 54 through at least a portion of surface 66 of wall 64 of second fastener hole 48. The measured amount of light transmitted to photodetector 62 may then be compared to a precalculated acceptable range of percentage of light transmission. A measured percentage of light transmitted to photodetector 62 that falls outside the predetermined acceptable range is correlated with the presence of a crazing condition in and on surface 66 of wall 64 of second fastener hole 48. The precalculated acceptable range of percentage light transmission is determined by measuring percentage light transmission for correctly drilled holes (e.g., where the laser light source is directed into transparent material 50 from a correctly drilled hole and toward a correctly drilled adjacent hole). The percent transmission through the correctly drilled holes may be standardized at, for example, 50% and the precalculated acceptable range of percentage transmission may be 50%+/−10% to allow for normal variation among various correctly drilled holes. In this example, inspection of adjacent holes resulted in a transmission of more than 60% light or less than 40% light may be considered outside the predetermined acceptable range and therefore could be subject to further review. It should be appreciated, however, that the determined value and/or range of percentage transmission values may vary in accordance with design considerations, such as the configuration and geometry of the holes being inspected, and the characteristics of both the light source and the transparent material being examined, among other factors.

Where illumination probe 42 defines a first longitudinal axis 67, and detection probe 44 defines a second longitudinal axis 68, then inspection apparatus 40 can be configured so that first and second longitudinal axes 67 and 68 are parallel or substantially parallel. Illumination probes having such a parallel configuration may be particularly useful for inspection of holes that are disposed parallel or substantially parallel to each other.

The orientation angles of the first reflective surface 52 and the second reflective surface 60 are selected so that laser light 56 is reflected by first reflective surface 52, passes through transparent material 50, and is reflected by second reflective surface 60 to photodetector 62. A selection of orientation angles or combinations of orientations angles that result in laser light 56 reaching photodetector 62 in this way are suitable orientation angles for the purposes of the present disclosure. First reflective surface 52 is typically configured so that first reflective surface 52 is oriented at an angle of about 45 degrees to first longitudinal axis 67, and second reflective surface 60 is typically configured so that surface 60 is oriented at an angle of about 45 degrees to second longitudinal axis 68, where "about 45 degrees" is 45°±5°.

Figure 5:
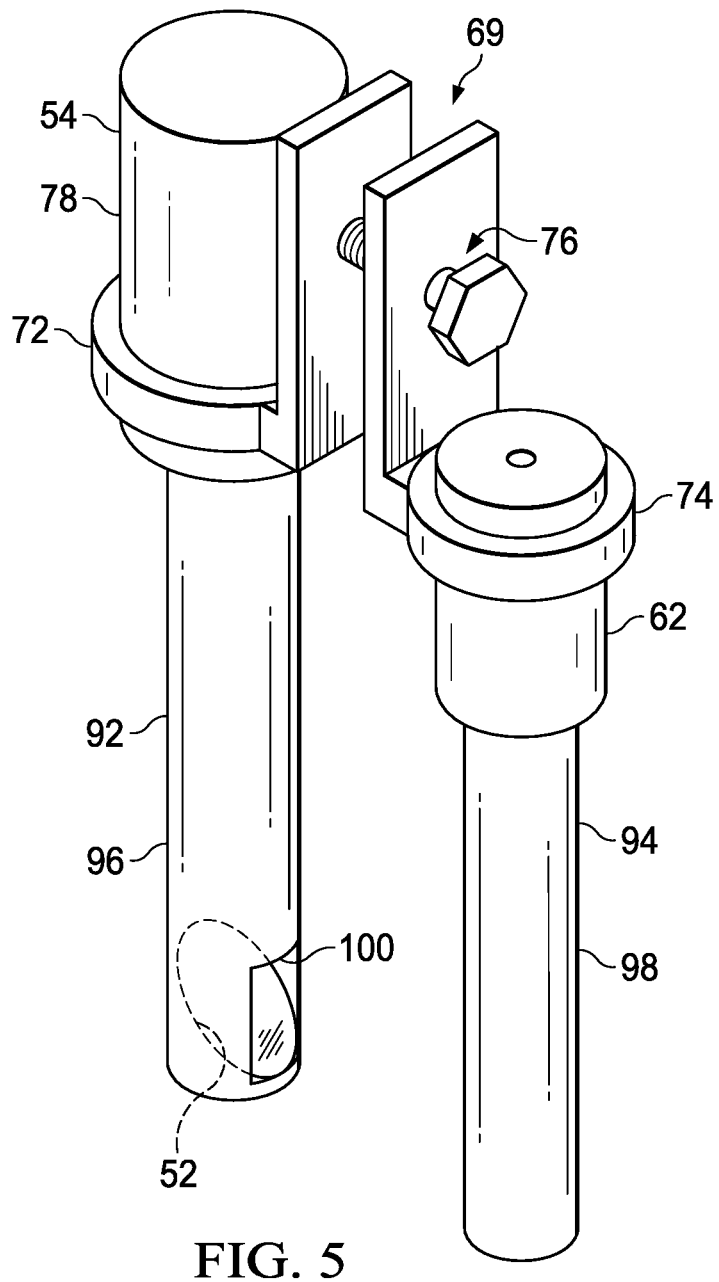
FIG. 5 depicts the inspection apparatus of FIG. 4.

As shown in FIG. 4, inspection apparatus 40 optionally further includes an adjustable coupling 69 that adjustably couples illumination probe 42 and detection probe 44 to one another. Adjustable coupling 69 may be configured to fix a desired alignment between illumination probe 42 and detection probe 44. Alternatively, or in addition, adjustable coupling 69 may be configured so that a separation distance 70 between illumination probe 42 and detection probe 44 can be adjusted. FIGS. 4 and 5 depict an adjustable coupling 69 that includes a first bracket 72, a second bracket 74, and a spacing adjustment mechanism 76 between first bracket 72 and second bracket 74.

Adjustable coupling 69 may be configured so that illumination probe 42 can be separately and individually clamped by first bracket 72, and detection probe 44 can be separately and individually clamped by second bracket 74. In this way, the vertical position of laser light source 54 and photodetector 62 can be individually adjusted. Alternatively, or in addition, one or both of illumination probe 42 and detection probe 44 can be removed and replaced in order to select a probe having a desired laser light source 54, or to select a probe having a desired length and/or diameter in order to match a variation in hole depth or diameter. Adjustable coupling 69 may further facilitate a separate attachment and adjustment of each of the first reflective surface 52 and second reflective surface 60, so as to permit these surfaces to be centered and correctly aligned in order to accurately reflect laser light 56.

Spacing adjustment mechanism 76 adjustably couples first bracket 72 and second bracket 74, such that the spacing between illumination probe 42 and detection probe 44 can be adjusted in order to match the spacing between first fastener hole 46 and second fastener hole 48. Any mechanism for adjustably coupling first bracket 72 and second bracket 74 may be a suitable mechanism for the purposes of this disclosure. As exemplified in FIGS. 4 and 5, spacing adjustment mechanism 76 may include a threaded spacer, such as a knurled screw, to facilitate the adjustment of spacing between illumination probe 42 and detection probe 44, but it is understood that alternative mechanism may also be used, such as a slide-and-clamp mechanism, or a mechanism configured to permit selection of distinct and preset values for a spacing between the illumination probe 42 and detection probe 44.

The exemplary apparatus of FIGS. 4 and 5 includes a laser light source 54 having a single laser 78. Laser 78 can be any type of laser that is sufficiently compact to be incorporated into inspection apparatus 40, with sufficiently low energy requirements that powering laser 78 could be accomplished with conventional power sources, whether portable or external, such as for example a diode laser.

Where laser light source 54 includes a diode laser, the wavelength of the diode laser can be selected for the particular application of the inspection apparatus. Selected diode lasers may have emission bands that are infrared, red, blue, or green, among others. For example, the diode laser can be selected to produce light having a wavelength that exhibits enhanced transmissivity through transparent material 50.

Figure 6:
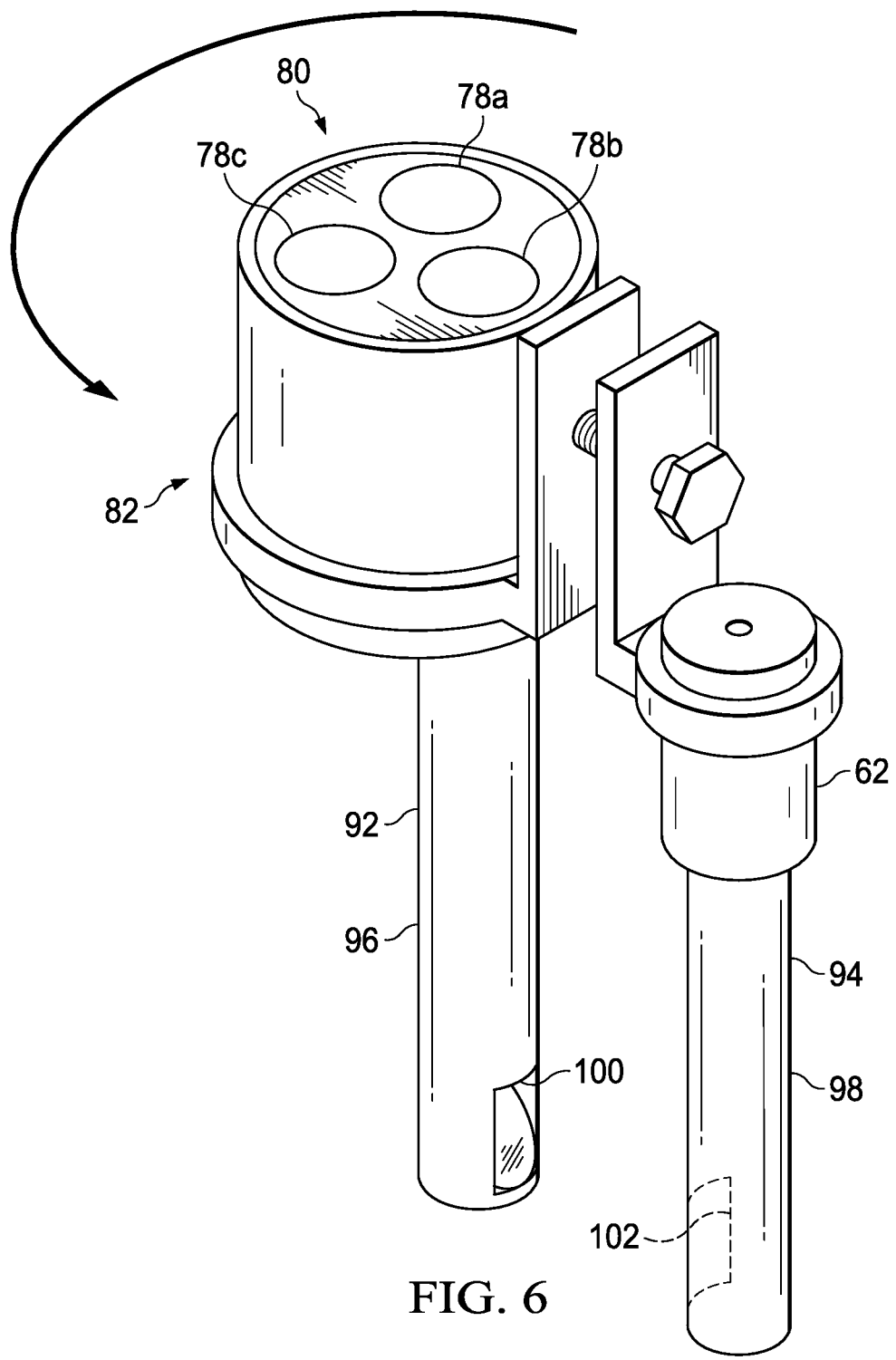
FIG. 6 depicts an alternative inspection apparatus incorporating a plurality of laser light sources according to the present disclosure.
Figure 7:
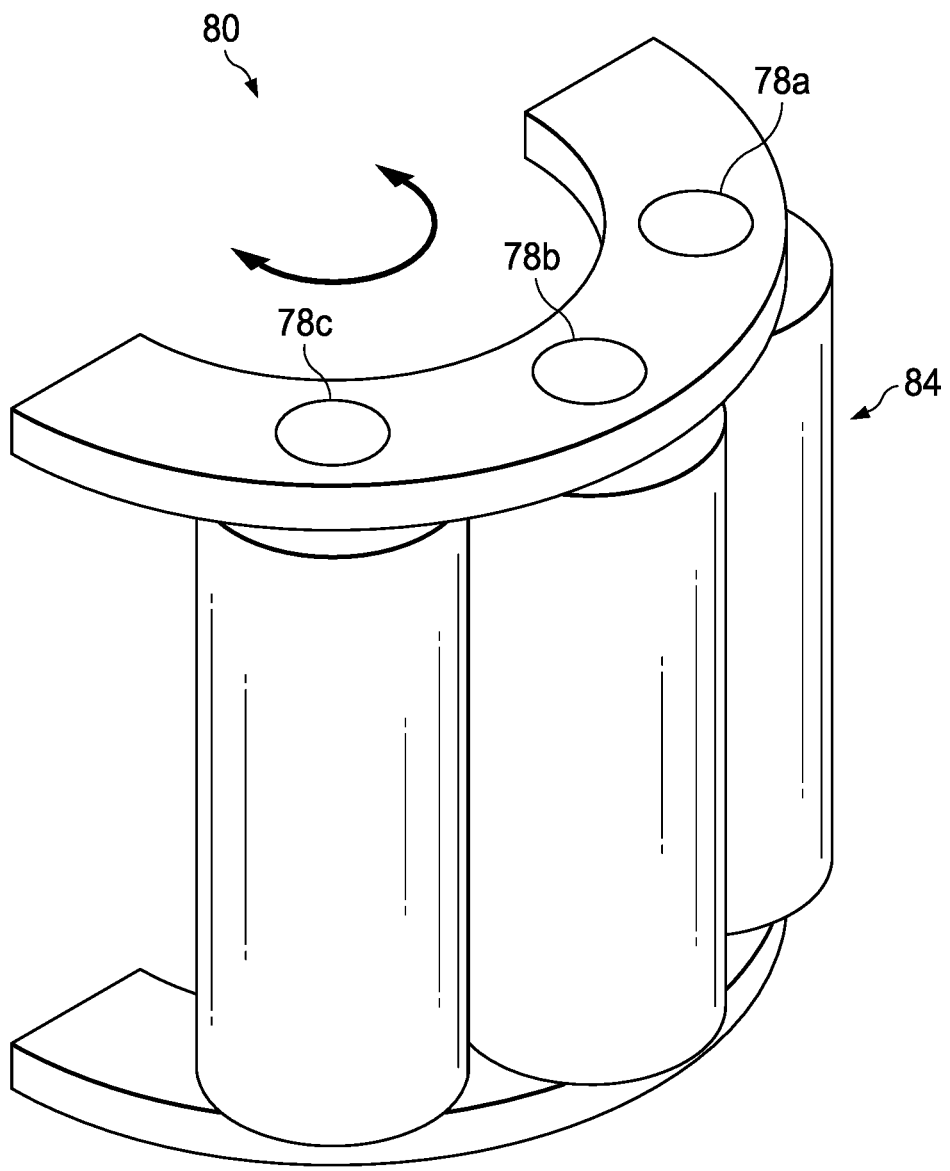
FIG. 7 depicts an alternative arrangement of a plurality of laser light sources for the inspection apparatus of the present disclosure.

Alternatively, with reference to FIGS. 6 and 7, laser light source 54 may include a plurality of lasers 80, including for example individual lasers 78a, 78b, and 78c, as shown in FIGS. 6 and 7. Where inspection apparatus 40 includes a plurality of individual lasers, the lasers may be selected so that each of the plurality of lasers exhibits an emission wavelength that is distinct from every other laser of the plurality of lasers. Alternatively, or in addition, laser light source 54 can be configured so that each of the plurality of lasers can be individually selectable, such that a desired laser selected from the plurality of lasers can be selected to direct laser light along illumination probe 42 and into first fastener hole 46.

As shown in FIG. 6, such a plurality of lasers 80 is optionally disposed within a rotatable cassette 82 configured such that by an incremental rotation of cassette 82 an individual laser can be selected for use with inspection apparatus 40. Alternatively, a plurality of lasers can be disposed in a straight cassette, such that selection of an individual laser can be accomplished by sliding the cassette back and forth. As shown in FIG. 7, a plurality of lasers 80 can alternatively be disposed within an arcuate cassette 84, such that selection of an individual laser is accomplished by urging arcuate cassette 84 in a curving motion until the desired laser is appropriately aligned with the longitudinal axis of illumination probe 42.

The first and second reflective surfaces 52 and 60 may be manufactured from any material that is sufficiently reflective at the wavelengths of light being used to be practical. Conventional glass-based mirror surfaces can be used, but they may compromise the durability of the resulting apparatus. Alternatively, one or both of first and second reflective surfaces 52 and 60 can be polished metal surfaces. As an example, each of first and second reflective surfaces 52 and 60 can include a polished metal surface that is formed on a segment of a cylindrical stainless steel rod 86, where stainless steel rod 86 can have diameter selected to fit within one of the first and second fastener holes 46 and 48, and each of the first and second reflective surfaces 52 and 60 is formed at an angle of about 45 degrees to a long axis of stainless steel rod 86.

In order to be insertable into the first and second fastener holes 46 and 48, and more particularly in order to maintain a suitable optical alignment with laser light source 54 and photodetector 62, respectively, the first reflective surface 52 may be coupled to the laser light source 54 by a substantially stiff coupling 88, and the second reflective surface 60 may be coupled to photodetector 62 by a substantially stiff coupling 90. Any couplings that can maintain the desired alignment and spacing of the first and second reflective surfaces 52 and 60 is a suitable coupling for the disclosed apparatus, but couplings that include a hollow cylinder that is sized and shaped to be inserted into the first and second fastener holes 46 and 48 are particularly advantageous. As shown in the exemplary apparatus of FIGS. 4-6, the first cylindrical coupling 92 and second cylindrical coupling 94 include a first cylinder wall 96 and a second cylinder wall 98, respectively, in which are defined a first aperture 100 and a second aperture 102, respectively. First and second reflective surfaces 52, 60 are configured in combination with first cylindrical coupling 92, second cylindrical coupling 94, first aperture 100 and second aperture 102 so that first aperture 100 is opposed to and facing second aperture 102, and further so that laser light 56 from laser light source 54 is reflected by first reflective surface 52, passes through first aperture 100 and second aperture 102 to be reflected by second reflective surface 60 to strike photodetector 62.

Figure 8:
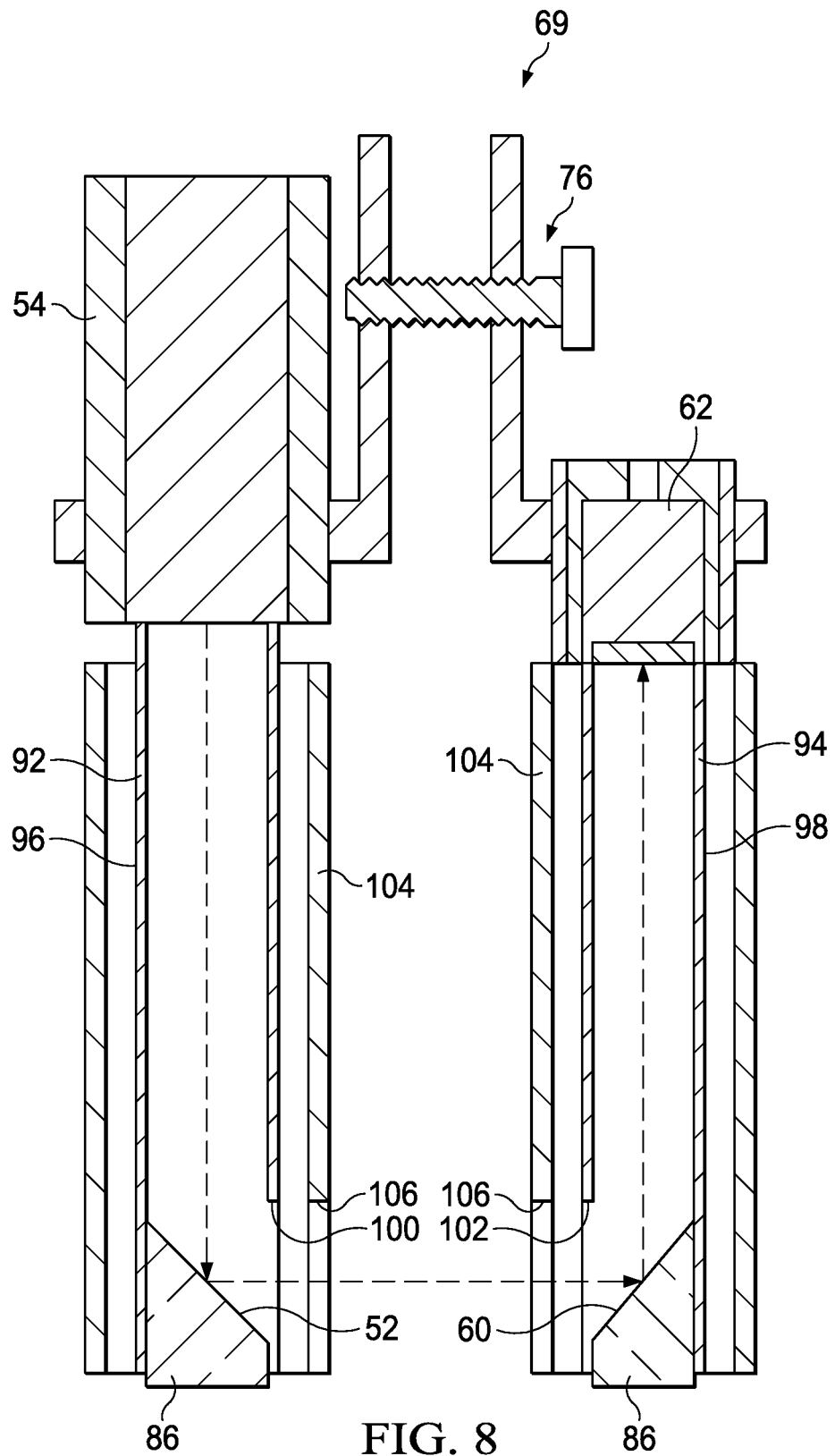
FIG. 8 is a cross-section view of the inspection apparatus of FIG. 4 fitted with larger cylindrical sleeves.

Exemplary first and second cylindrical couplings 92, 94 are sized so that they are insertable into first and second holes 46, 48. Where it may be desirable to employ apparatus 40 to inspect larger or smaller holes in a transparent material, first and second cylindrical couplings 92 and 94 may be replaced by alternative cylindrical couplings having a greater or a lesser diameter that are selected to match the diameter of the holes to be inspected. Alternatively, the time and effort to disassemble and reassemble apparatus 40 with an appropriate pair of cylindrical couplings is avoided by employing a first and second cylindrical coupling 92, 94 that are sized to be as small as the smallest hole expected to be inspected, and where inspection of a larger hole is desired illumination probe 42 and detection probe 44 can be covered by larger cylindrical sleeves 104 that are configured to be placed over first and second cylindrical coupling 92 and 94, and that each define an aperture 106 that are aligned with either first aperture 100 or second aperture 102, respectively, as shown in FIG. 8.

Photodetector 62 may employ any suitable light detection and/or measurement apparatus for measuring an intensity of light reflected to photodetector 62 by second reflective surface 60. The disclosed inspection apparatus may be manufactured and operated more economically, however, by employing photodetectors that include one or more photodiodes as light detectors.

Example 2

Figure 9:
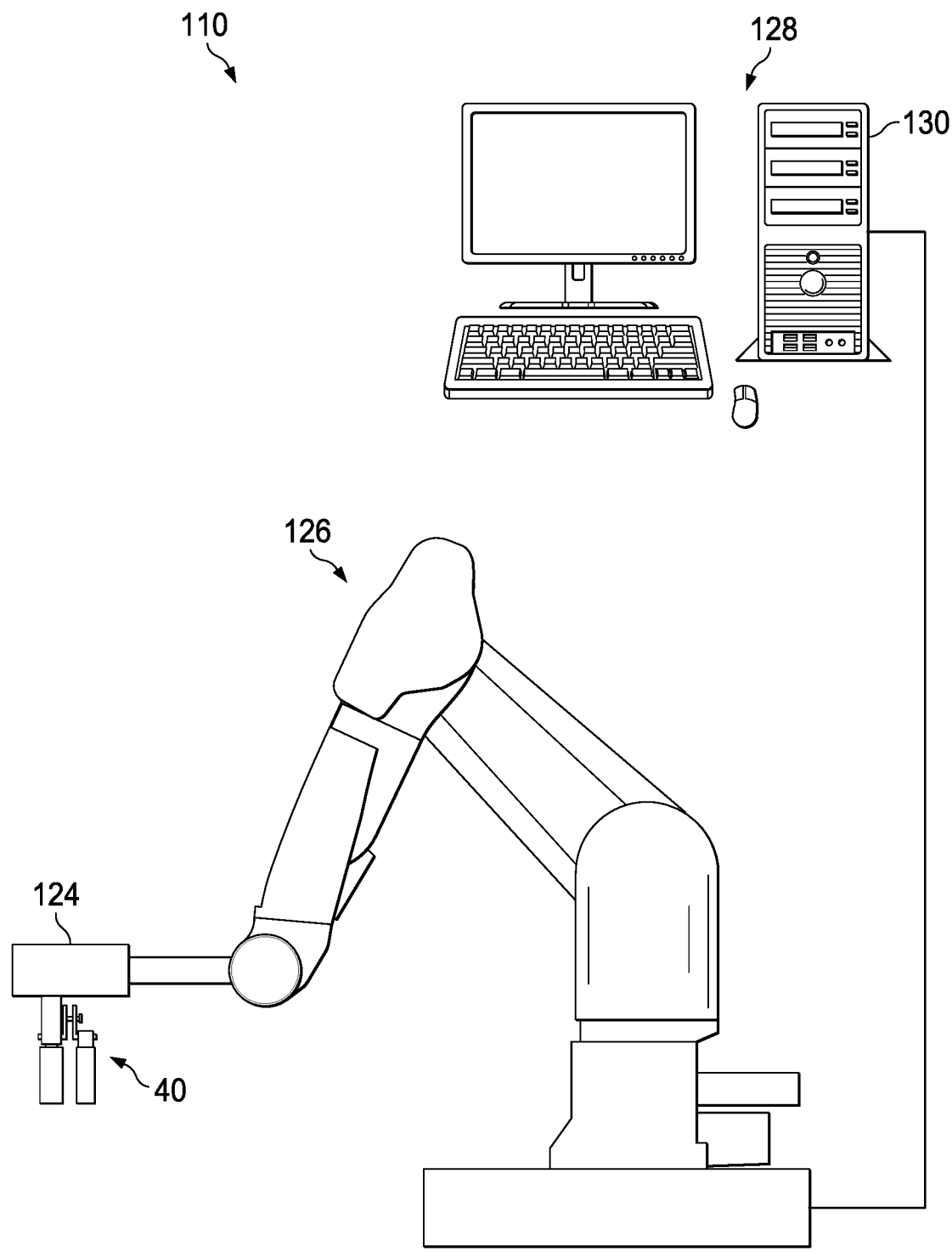
FIG. 9 semi-schematically depicts an illustrative automated inspection system according to the present disclosure.

FIG. 9 illustrates an exemplary system 110 for inspecting holes machined in a transparent material. As shown, system 110 includes inspection apparatus 40 that in turn includes illumination probe 42 and detection probe 44, where the illumination probe 42 and detection probes 44 are sized and spaced to be simultaneously inserted into the first hole 46 and the second hole 48 of two adjacent holes machined in the transparent material 50.

Illumination probe 42 includes laser light source 54 and the first reflective surface 52 at distal portion 112 of illumination probe 42, so that, when at least distal portion 112 of illumination probe 42 is inserted into first hole 46, laser light source 54 directs laser light 56 along first hole 46 to first reflective surface 52 at distal portion 112 of illumination probe 42. First reflective surface 52 is oriented so that laser light 56 is reflected by first reflective surface 52 into transparent material 50 and towards second hole 48.

Detection probe 44 includes photodetector 62 and second reflective surface 60 at a distal portion 114 of detection probe 44, so that, when at least distal portion 114 of detection probe 44 is inserted into second hole 48, the second reflective surface 60 at distal portion 114 of detection probe 44 is oriented so that laser light 56 that is reflected by first reflective surface 52 into transparent material 50 and towards second hole 48 is incident upon and is reflected by second reflective surface 60 outwardly along second hole 48 to photodetector 62, where photodetector 62 measures the light intensity of the reflected laser light.

Inspection apparatus 40 of system 110 further includes a processor 65, where processor 65 is configured to receive a measured light intensity value from photodetector 62 and compare the measured light intensity value with a standard value, and to correlate the measured light intensity value with a presence or absence of a threshold amount of crazing at wall surface 66 of second hole 48.

System 110 may be configured so that inspection apparatus 40 is a substantially portable apparatus. That is, apparatus 40 is easy to carry or move, and can be readily moved from one workpiece to another workpiece within a workplace, or from workplace to workplace, as needed. Where inspection apparatus 40 is a substantially portable apparatus, processor 65 can be a local processor that is incorporated in inspection apparatus 40, and the presence or absence of the threshold amount of crazing at a wall surface of one of the first and second holes 46, 48 can be displayed on a display 118 of the portable inspection apparatus 40.

Alternatively, system 110 may be configured so that processor 65 is remote from the remainder of inspection apparatus 40, and the light intensity value measured by photodetector 62 is transmitted to processor 65 using a wired connection 120 or a wireless connection 122.

Alternatively, or in addition, system 110 may be configured so that system 110 is an automated system. For example system 110 may include inspection apparatus 40 where inspection apparatus are configured to be coupled to an end effector 124 of a robotic arm assembly 126, as shown in FIG. 9. Automated system 110 can further include an automated controller 128 that is configured to employ inspection apparatus 40 to sequentially inspect a plurality of holes machined in a transparent material, for example where such sequential inspection is carried out substantially autonomously, or independently, and without direct control by an operator.

Robotic arm assembly 126 may be coupled to, and operated by, an automated controller 128 that includes one or more additional processors 130. Processor(s) 130 may include software corresponding to a user interface, where the user interface permits an operator to program system 110 to execute a desired sequence of movements and operations required to identify and designate each of a series of machined fastener holes, to move inspection apparatus 40 from designated machined fastener hole to designated machined fastener hole, and to inspect the light transmission through the inner surface of each designated machined fastener hole via illumination through a neighboring fastener hole, as described in the present disclosure. The user interface may accept inputs such as, for example, the dimensions of the workpiece, the location of each hole to be designated and inspected, the diameter and/or depth of each designated hole, and the length and diameter of the illumination probe 42 and detection probe 44. The user interface may be configured so that the parameters for the inspection of the machined fastener holes is specified by an operator. Alternatively, the user interface may permit an operator to simply input a series of defining parameters, such as for example the dimensions of the workpiece, including the coordinates of each machined fastener hole to be inspected, as inputs, and the user interface may then create an appropriate hole inspection pattern to satisfactorily inspect each designated machined hole of the object of manufacture.

Various aspects of the user interface, as well as the operating software to control the robotic arm assembly 126, may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

Instructions for an operating system, applications, and/or programs may be located in one or more storage devices in communication with the one or more processor units through a communications framework. The instructions may be in a functional form on a persistent storage. These instructions may be loaded into a memory for execution by processor 130.

These instructions may be referred to as program instructions, program code, computer usable program code, or computer readable program code that may be read and executed by processor 130. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, radio frequency (RF), and/or the like, and/or any suitable combination of these. Computer program code for carrying out operations for aspects of the present disclosure may be written in any appropriate programming language. The program code may be written in a programming language intended for the robotic system being controlled, such as for example the TPP and KAREL programming languages that are useful for FANUC robotic systems. Alternatively or in addition, the program code may include any of a variety of programming languages, including object-oriented programming languages (such as Java, Smalltalk, C++, and/or the like), or conventional procedural programming languages (such as the C programming language, among others). The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts described herein and/or specified in flowchart 140. Any description, flowchart, or drawing in the present disclosure is intended to illustrate the architecture, functionality, and/or operation of possible implementations of systems, methods, and computer program products according to aspects of the present disclosure.

Example 3

Figure 10:
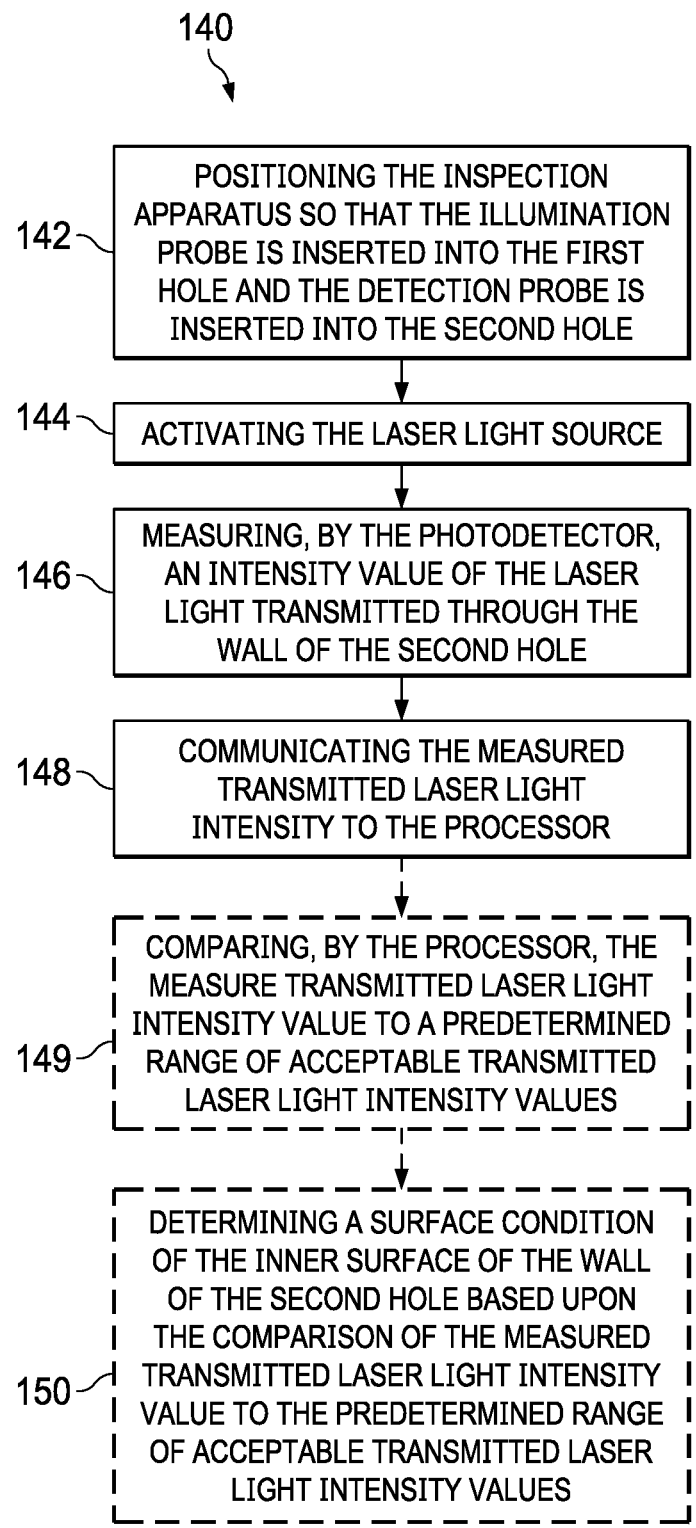
FIG. 10 is a flowchart describing an illustrative method of inspection according to the present disclosure.

The apparatus and systems of the present disclosure lend themselves advantageously to methods of inspecting holes machined in a transparent material. An exemplary method of inspecting holes in transparent material is set out in flowchart 140 of FIG. 10. The exemplary method includes positioning inspection apparatus 40 so that illumination probe 42 is inserted into first hole 46 in the transparent material 50, and detection probe 44 is inserted into second hole 48 in the transparent material 50, as shown at step 142 of flowchart 140. The exemplary method further includes activating laser light source 54, as shown at step 144 of flowchart 140. The exemplary method further includes measuring by photodetector 62 an intensity value of laser light 56 transmitted through second wall 64 of second hole 48, as shown at step 146 of flowchart 140. The exemplary method further includes communicating the measured transmitted laser light intensity value to processor 65.

The exemplary method of flowchart 140 can additionally include comparing, by processor 65, the measured transmitted laser light intensity value to a predetermined range of acceptable transmitted laser light intensity values, as shown at step 148 of flowchart 140; and determining a surface condition of a machined inner surface 66 of second wall 64 of second hole 48 based upon the comparison of the measured transmitted laser light intensity value to the predetermined range of acceptable transmitted laser light intensity values, as shown at step 150 of flowchart 140.

Determining the surface condition of machined inner surface 66 of second wall 58 of second hole 64 optionally further includes determining a crazing condition of machined inner surface 66 of second wall 64 of second hole 48.

The step of positioning inspection apparatus 40 so that illumination probe 42 is inserted into first hole 46 in the transparent material 50, and detection probe 44 is inserted into second hole 48 in the transparent material 50 optionally further includes positioning inspection apparatus 40 into a first and second holes 46, 48 in a transparent material 50 that is at least partially enclosed by one or more substantially opaque materials, such as rail 12.

The steps of the exemplary method set out in flowchart 140 are optionally performed using an automated system, as described above.

Example 4

This section describes additional aspects and features of the disclosed apparatus, systems, and methods presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An inspection apparatus, including a processor; an illumination probe, the illumination probe including a first reflective surface configured to be inserted into a first fastener hole formed in a transparent material; a laser light source configured to direct laser light into the first fastener hole so that the laser light is incident upon the first reflective surface within the first fastener hole, such that at least a portion of the incident laser light is reflected by the first reflective surface through a wall of the first fastener hole and into the transparent material; and a detection probe, the detection probe including a photodetector positioned to detect laser light directed from a second fastener hole formed in the transparent material adjacent to the first fastener hole and transmit a corresponding light intensity value to the processor; and a second reflective surface configured to be inserted into the second fastener hole and oriented such that laser light reflected from the first reflective surface that passes through the wall of the first fastener hole and through a wall of the second fastener hole to strike the second reflective surface is reflected toward the photodetector, and where the processor is configured to receive the corresponding light intensity value and compare the corresponding light intensity value to a standard intensity value.

A2. The inspection apparatus of paragraph A1, where the processor is further configured to calculate a percentage of light transmitted from the laser light source through at least a portion of a surface of the wall of the second fastener hole; and correlate the calculated percentage of light transmitted with a presence or absence of surface crazing in the wall of the second fastener hole.

A3. The inspection apparatus of any of paragraphs A1-A2, where the illumination probe defines a first longitudinal axis, and the detection probe defines a second longitudinal axis, and the first and second longitudinal axes are substantially parallel.

A4. The inspection apparatus of any preceding paragraph, where the first reflective surface is oriented at an angle of about 45 degrees to the first longitudinal axis, and the second reflective surface is oriented at an angle of about 45 degrees to second longitudinal axis.

A5. The inspection apparatus of any preceding paragraph, where the illumination probe and the detection probe are adjustably coupled to one another, so that a separation distance between the illumination probe and the detection probe is adjustable.

A6. The inspection apparatus of any preceding paragraph, where the laser light source includes a plurality of individual lasers, each of the plurality of lasers having a wavelength distinct from every other laser of the plurality of lasers, and each of the plurality of lasers being individually selectable to direct laser light into the first fastener hole.

A7. The inspection apparatus of any preceding paragraph, where each of the first and second reflective surfaces is a polished metal surface.

A8. The inspection apparatus of any preceding paragraph, where each of the first and second reflective surfaces is formed on a segment of a stainless steel rod, where the stainless steel rod has a diameter selected to be insertable into one of the first and second fastener holes, and each reflective surface is formed at an angle of about 45 degrees to a long axis of the stainless steel rod.

A9. The inspection apparatus of any preceding paragraph, where each of the first and second reflective surfaces is coupled to the laser light source and photodetector, respectively, by a stiff coupling.

A10. The inspection apparatus of paragraph A9, where the first reflective surface is coupled to the laser light source by a stiff coupling that includes a first hollow cylinder, the first hollow cylinder having a first aperture defined in a wall of the first hollow cylinder; the second reflective surface is coupled to the photodetector by a stiff coupling that includes a second hollow cylinder, the second hollow cylinder having a second aperture defined in a wall of the second hollow cylinder; and the first aperture faces the second aperture such that laser light from the laser light source that is reflected by the first reflective surface passes through the first and second apertures to be reflected by the second reflective surface onto the photodetector.

A11. The inspection apparatus of any preceding paragraph, where the photodetector includes a photodiode.

B1. A system for inspecting holes machined in a transparent material, including an inspection apparatus having a illumination probe and a detection probe, where the illumination and detection probes are sized and spaced to be simultaneously inserted into a first and a second of two adjacent holes machined in the transparent material; the illumination probe including a laser light source and a first reflective surface at a distal portion of the illumination probe, the illumination probe being configured so that when the illumination probe is inserted into the first hole the laser light source directs laser light along the first hole to the first reflective surface at the distal portion of the illumination probe, the first reflective surface being oriented so that the laser light is reflected by the first reflective surface into the transparent material and towards the second hole; the detection probe including a photodetector and a second reflective surface at a distal portion of the detection probe, the detection probe being configured so that when the detection probe is inserted into the second hole the second reflective surface at the distal portion of the detection probe is oriented so that the laser light reflected by the first reflective surface into the transparent material and towards the second hole is incident upon and reflected by the second reflective surface outwardly along the second hole to the photodetector, where the photodetector measures the light intensity of the reflected laser light; and a processor, configured to receive a measured light intensity value from the photodetector and compare the measured light intensity value with a standard value and to correlate the measured light intensity value with a presence or absence of a threshold amount of crazing at a wall surface of the second hole.

B2. The system of paragraph B1, where the inspection apparatus is a portable apparatus, the processor is a local processor incorporated in the inspection apparatus, and the presence or absence of the threshold amount of crazing at the wall surface of one of the first and second adjacent holes is displayed on a display of the portable apparatus.

B3. The system of any of paragraphs B1-B2, where the system is an automated system, and the inspection apparatus is configured to be coupled to an end effector of a robotic arm assembly; where the automated system further comprises an automated controller configured to sequentially inspect a plurality of holes machined in the transparent material using the inspection apparatus.

B4. The system of paragraph B3, where the processor is remote from the inspection apparatus, and the measured light intensity value is transmitted to the processor using a wired or wireless connection.

C1. A method of inspecting holes machined in a transparent material using an inspection apparatus having an illumination probe and a detection probe, the method including positioning the inspection apparatus so that the illumination probe is inserted into a first hole in the transparent material and the detection probe is inserted into a second hole in the transparent material; where the illumination probe includes a first reflective surface at a distal portion of the illumination probe that is configured to be inserted into the first hole, and a laser light source configured to direct laser light along the first hole to strike the first reflective surface, so that at least a portion of the incident laser light is reflected by the first reflective surface through a first wall of the first fastener hole and into the transparent material; and the detection probe includes a second reflective surface at a distal portion of the detection probe that is configured to be inserted into the second hole, and a photodetector configured to measure an incident light intensity, so that at least a portion of the laser light passing through the first wall of the first hole and a second wall of the second hole is reflected by the second reflective surface to the photodetector; activating the laser light source; measuring by the photodetector an intensity value of the laser light transmitted through the second wall of the second hole; and communicating the measured transmitted laser light intensity value to a processor.

C2. The method of paragraph C1, where communicating the measured transmitted laser light intensity value to the processor includes comparing by the processor the measured transmitted laser light intensity value to a predetermined range of acceptable transmitted laser light intensity values; and determining a surface condition of a machined inner surface of the second wall of the second hole based upon the comparison of the measured transmitted laser light intensity value to the predetermined range of acceptable transmitted laser light intensity values.

C3. The method of paragraph C2, where determining the surface condition of the machined inner surface of the second wall of the second hole includes determining a crazing condition of the machined inner surface of the second wall of the second hole.

C4. The method of paragraph C3, where the steps of the method are performed using an automated system.

C5. The method of any of paragraphs C1-C4, where positioning the inspection apparatus into the first and second holes in the transparent material includes positioning the inspection apparatus into a first and second holes in a transparent material that is at least partially enclosed by one or more substantially opaque materials.

Advantages, Features, Benefits

The different embodiments and examples of the apparatus, systems, and methods described herein provide several advantages over known solutions for inspecting fastener holes in glassy materials that may exhibit crazing after machining.

Illustrative embodiments and examples of the apparatus, systems, and methods described herein permit a rapid and inexpensive means of detecting crazing in machined holes, even where the hole may not be directly observable.

Additionally, the present method may provide a more definitive identification of crazing in test samples than previous optical methods, for example by reducing and/or eliminating subjective human analyses of light diffusion and/or transmission in favor of objective quantitative evaluations of light transmission.

Furthermore, the disclosed method and apparatus lend themselves to automation, such that the resulting manufacturing process would requires shorter cycle times and the quality of the product would improve.

CONCLUSION

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An inspection apparatus, comprising:
a processor;
an illumination probe, the illumination probe including:
a first reflective surface configured to be inserted into a first fastener hole formed in a transparent material;
a laser light source configured to direct laser light into the first fastener hole so that the laser light is incident upon the first reflective surface within the first fastener hole, such that at least a portion of the incident laser light is reflected by the first reflective surface through a wall of the first fastener hole and into the transparent material; and
a detection probe, the detection probe including:
a photodetector positioned to detect laser light directed from a second fastener hole formed in the transparent material adjacent to the first fastener hole and transmit a corresponding light intensity value to the processor; and
a second reflective surface configured to be inserted into the second fastener hole and oriented such that laser light reflected from the first reflective surface that passes through the wall of the first fastener hole and through a wall of the second fastener hole to strike the second reflective surface is reflected toward the photodetector, and
wherein the processor is configured to receive the corresponding light intensity value and compare the corresponding light intensity value to a standard intensity value.

2. The inspection apparatus of claim 1, wherein the processor is further configured to calculate a percentage of light transmitted from the laser light source through at least a portion of a surface of the wall of the second fastener hole; and correlate the calculated percentage of light transmitted with a presence or absence of surface crazing in the wall of the second fastener hole.

3. The inspection apparatus of claim 1, wherein the illumination probe defines a first longitudinal axis, and the detection probe defines a second longitudinal axis, and the first and second longitudinal axes are substantially parallel.

4. The inspection apparatus of claim 3, wherein the first reflective surface is oriented at an angle of about 45 degrees to the first longitudinal axis, and the second reflective surface is oriented at an angle of about 45 degrees to second longitudinal axis.

5. The inspection apparatus of claim 1, wherein the illumination probe and the detection probe are adjustably coupled to one another, so that a separation distance between the illumination probe and the detection probe is adjustable.

6. The inspection apparatus of claim 1, wherein the laser light source includes a plurality of individual lasers, each of the plurality of lasers having a wavelength distinct from every other laser of the plurality of lasers, and each of the plurality of lasers being individually selectable to direct laser light into the first fastener hole.

7. The inspection apparatus of claim 1, wherein each of the first and second reflective surfaces is a polished metal surface.

8. The inspection apparatus of claim 1, wherein each of the first and second reflective surfaces is formed on a segment of a stainless steel rod, where the stainless steel rod has a diameter selected to be insertable into one of the first and second fastener holes, and each reflective surface is formed at an angle of about 45 degrees to a long axis of the stainless steel rod.

9. The inspection apparatus of claim 1, wherein each of the first and second reflective surfaces is coupled to the laser light source and photodetector, respectively, by a stiff coupling.

10. The inspection apparatus of claim 9, wherein the first reflective surface is coupled to the laser light source by a stiff coupling that includes a first hollow cylinder, the first hollow cylinder having a first aperture defined in a wall of the first hollow cylinder;
the second reflective surface is coupled to the photodetector by a stiff coupling that includes a second hollow cylinder, the second hollow cylinder having a second aperture defined in a wall of the second hollow cylinder; and
the first aperture faces the second aperture such that laser light from the laser light source that is reflected by the first reflective surface passes through the first and second apertures to be reflected by the second reflective surface onto the photodetector.

11. The inspection apparatus of claim 1, wherein the photodetector includes a photodiode.

12. A system for inspecting holes machined in a transparent material, comprising:
an inspection apparatus having an illumination probe and a detection probe, wherein the illumination and detection probes are sized and spaced to be simultaneously inserted into a first and a second of two adjacent holes machined in the transparent material;
the illumination probe including a laser light source and a first reflective surface at a distal portion of the illumination probe, the illumination probe being configured so that when the illumination probe is inserted into the first hole the laser light source directs laser light along the first hole to the first reflective surface at the distal portion of the illumination probe, the first reflective surface being oriented so that the laser light is reflected by the first reflective surface into the transparent material and towards the second hole;
the detection probe including a photodetector and a second reflective surface at a distal portion of the detection probe, the detection probe being configured so that when the detection probe is inserted into the second hole the second reflective surface at the distal portion of the detection probe is oriented so that the laser light reflected by the first reflective surface into the transparent material and towards the second hole is incident upon and reflected by the second reflective surface outwardly along the second hole to the photodetector, where the photodetector is configured to measure a light intensity of the reflected laser light; and
a processor, configured to receive a measured light intensity value from the photodetector and compare the measured light intensity value with a standard value and to correlate the measured light intensity value with a presence or absence of a threshold amount of crazing at a wall surface of the second hole.

13. The system of claim 12, wherein the inspection apparatus is a portable apparatus, the processor is a local processor incorporated in the inspection apparatus, and the presence or absence of the threshold amount of crazing at the wall surface of one of the first and second adjacent holes is displayed on a display of the portable apparatus.

14. The system of claim 12, wherein the system is an automated system, and the inspection apparatus is configured to be coupled to an end effector of a robotic arm assembly; wherein the automated system further comprises an automated controller configured to sequentially inspect a plurality of holes machined in the transparent material using the inspection apparatus.

15. The system of claim 14, wherein the processor is remote from the inspection apparatus, and the measured light intensity value is transmitted to the processor using a wired or wireless connection.

16. A method of inspecting holes machined in a transparent material using an inspection apparatus having an illumination probe and a detection probe, the method comprising:
positioning the inspection apparatus so that the illumination probe is inserted into a first hole in the transparent material and the detection probe is inserted into a second hole in the transparent material; wherein
the illumination probe includes a first reflective surface at a distal portion of the illumination probe that is configured to be inserted into the first hole, and a laser light source configured to direct laser light along the first hole to strike the first reflective surface, so that at least a portion of the incident laser light is reflected by the first reflective surface through a first wall of the first hole and into the transparent material; and
the detection probe includes a second reflective surface at a distal portion of the detection probe that is configured to be inserted into the second hole, and a photodetector configured to measure an incident light intensity, so that at least a portion of the laser light passing through the first wall of the first hole and a second wall of the second hole is reflected by the second reflective surface to the photodetector;
activating the laser light source;
measuring by the photodetector an intensity value of the laser light transmitted through the second wall of the second hole;
communicating the measured transmitted laser light intensity value to a processor.

17. The method of claim 16, wherein communicating the measured transmitted laser light intensity value to the processor comprises:
comparing by the processor the measured transmitted laser light intensity value to a predetermined range of acceptable transmitted laser light intensity values; and
determining a surface condition of a machined inner surface of the second wall of the second hole based upon the comparison of the measured transmitted laser light intensity value to the predetermined range of acceptable transmitted laser light intensity values.

18. The method of claim 17, wherein determining the surface condition of the machined inner surface of the second wall of the second hole includes determining a crazing condition of the machined inner surface of the second wall of the second hole.

19. The method of claim 18, wherein the steps of the method are performed using an automated system.

20. The method of claim 16, wherein positioning the inspection apparatus into the first and second holes in the transparent material includes positioning the inspection apparatus into a first and second holes in a transparent material that is at least partially enclosed by one or more substantially opaque materials.

* * * * *